United States Patent [19]

Korteqaard

[11] Patent Number: 4,820,171

[45] Date of Patent: Apr. 11, 1989

[54] COUPLING PLATE HAVING A PLURALITY OF ELECTRIC COUPLING POINTS, A METHOD OF PRODUCING SUCH A PLATE AND A USE OF THE COUPLING PLATE AS A PLANNING BOARD

[75] Inventor: Per Korteqaard, Aalborg, Denmark

[73] Assignee: A/S Modulex, Billund, Denmark

[21] Appl. No.: 96,626

[22] Filed: Sep. 14, 1987

[30] Foreign Application Priority Data

Sep. 12, 1986 [DK] Denmark ............... 4369/86

[51] Int. Cl.⁴ .................................. H01R 9/09
[52] U.S. Cl. ........................ 439/75; 29/831;
  29/835; 439/44; 439/45; 439/46
[58] Field of Search ................. 439/44–46,
  439/52, 53, 74, 75, 78, 81, 82, 86, 66, 91;
  29/831, 835; 446/91

[56] References Cited

U.S. PATENT DOCUMENTS

| | | | |
|---|---|---|---|
| 3,240,885 | 3/1966 | Grunfelder et al. | 439/44 |
| 3,299,393 | 1/1967 | Kelley et al. | 439/46 |
| 4,208,080 | 6/1980 | Teagno | 439/45 |
| 4,552,541 | 11/1985 | Bolli | 446/91 |
| 4,556,393 | 12/1985 | Bolli | 446/91 |
| 4,674,175 | 6/1987 | Stampfil | 29/835 |

FOREIGN PATENT DOCUMENTS

0236260 9/1987 European Pat. Off. ........ 446/91

Primary Examiner—P. Austin Bradley
Attorney, Agent, or Firm—Kane, Dalsimer, Sullivan, Kurucz, Levy, Eisele and Richard

[57] ABSTRACT

A coupling plate with a plurality of electric coupling points comprises, in a preferred embodiment, a pair of plane plates (10, 12), between which there is provided an electrically insulating carrier layer (11), on which a pattern of electrically conducting areas (21–26) is provided. In the preferred embodiment, an electric coupling point is provided for each mechanical coupling stud (15) projecting from the upper side of the top plate (10). The studs (15) are hollow and flush with projections (19) on the lower plate (12) so that punched parts of the electrically conducting areas (20, 22, 24, 26) are just moved into the hollow coupling studs by means of the projections (19) on the lower plate (12), thus making the conducting areas accessible through cuts (16) in the coupling studs (15). The invention also concerns a method of producing such a plate and a board consisting of a plurality of interconnected plates of said type.

12 Claims, 7 Drawing Sheets

COUPLING PLATE HAVING A PLURALITY OF ELECTRIC COUPLING POINTS, A METHOD OF PRODUCING SUCH A PLATE AND A USE OF THE COUPLING PLATE AS A PLANNING BOARD

The invention concerns a coupling plate consisting of a number of layers and having a plurality of electric coupling points to cooperate with electric coupling means on some elements when these are placed on the coupling plate.

The invention is particularly useful for a planning board where many different marking elements can be placed in a large number of different positions and are to be connected electrically to coupling points in the planning board in any of the possible positions. Thus, there is a need for a very large number of electric coupling points in the coupling plate, which will be expensive to produce with the prior art. The Danish Patent Application No. 625/84 discloses e.g. a technique in which pre-punched and pre-bossed sheet metal strips are mounted in a plastics housing, but this art cannot be used when a large number of conductors are to be mounted closely spaced from each other. This prior art also involves a great consumption of materials and the drawback that the tolerances for the conducting areas are given by the metal parts of the element which work thermally differently from the plastics material of the housing.

The object of the invention is to provide a coupling plate where it is possible to distribute a large number of electric coupling points over a plate in an inexpensive and rational manner, and which provides a very great reliability for the electric contact formation.

This object is achieved in that the coupling plate is constructed as stated in the characterizing portion of claim 1, providing for the rational manufacturing method which appears from the method of producing the coupling plate according to claim 6. In this way, power may be distributed to a large number of electric coupling points, and the advantages are particularly pronounced when several mutually insulated power paths are present. In case of many mutually insulated power paths, several layers of alternately insulating and conducting materials may be present between the two parallel plates.

The flaps may be fixed in the respective cavities in different ways, but preferably they are fixed by the means defined in claim 2.

The electric coupling points may be mechanically separated from means for securing the elements, but preferably the mechanical and electric coupling means are combined, as appears from claim 3.

By means of the features defined in claim 4 the individual layers may be fixed with respect to each other, so that small inaccuracies are distributed over the entire plate. A multiplug may be expediently obtained by the means defined in claim 5.

As indicated before, the invention also concerns a method of producing a coupling plate of the abovementioned type, and this method is characterized by being performed as stated in the characterizing portion of claim 6.

As stated in claim 7, the flaps may be introduced into the cavities by means of a tool and/or by means of the second plate defined in claim 8, where the projections also fix the flaps. The upper edge of the flaps may be formed as a cutting edge along a fraction of the arc length, said cutting edge cooperating with a cutting edge in connection with the associated cavity, so that punching and introduction as well as fixing of the flaps can take place in a single operation. The plates are preferably made by injection moulding of plastics so that the accuracy of the position of the conducting areas is determined by the injection moulded plastics material, i.e. independently of thermal movements of the metallic parts. As mentioned, the central layer may be a sandwich, cf. claim 9, which can be produced either by etching, vapor deposition, plasma jetting or other form of multiple plating. The last-mentioned techniques may also be used in the performance of the method according to claim 10, where the said layer may be a metallic or polymeric, e.g. carbonaceous material. For professional use of a coupling plate it is important that the electric connection is very reliable and long-term stable, which can be achieved by using silver or gold contacts, and precisely in the method of the invention it is possible to apply a layer of gold or another material just where it is needed. The metallic additional coating may also serve to improve the mechanical strength of the flaps, and finally it will be appreciated that certain coating techniques may also be used after the thin layer of material has been interposed between the plates.

The invention also concerns a board, in particular a planning board, for use in connection with various marking elements having coupling means for cooperation with electric coupling points in the board, said board being characterized by being composed of a plurality of coupling plates of the above-mentioned type. The coupling plates may e.g. be assembled to form a panorama screen or a large globe, but preferably the coupling plates are so assembled as appears from claim 12.

The invention will be explained more fully by the following description of some embodiments with reference to the drawing in which FIG. 1 schematically shows the starting situation of the invention, FIG. 2 schematically shows components of a board according to the invention, FIG. 8 shows a second embodiment of the board of the invention, while

With reference to FIGS. 1-7, the components included in a preferred embodiment of the planning board of the invention will be explained briefly in connection with the explanation of a first embodiment of the coupling plate. This explanation will also include a mention of the related Danish parallel applications Nos. 4368/86 and 4370/86, to give a complete impression of an important field of use for the invention.

Figure 1:
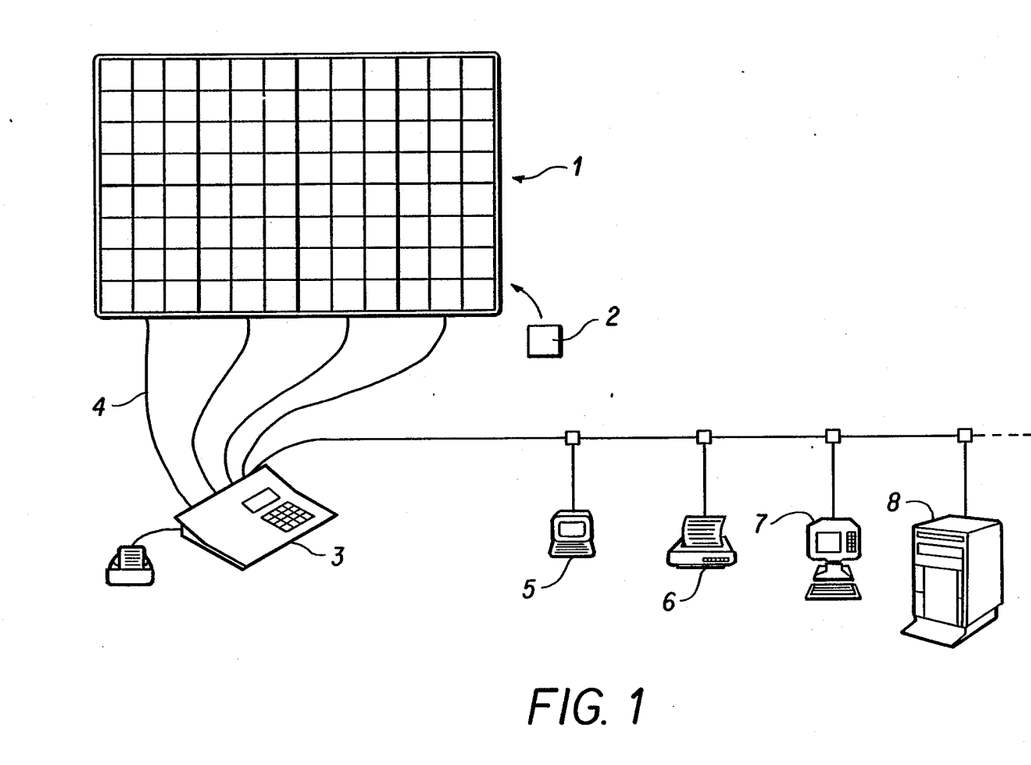

FIG. 1 shows a planning board 1 on which a plurality of marking elements 2 may be placed in a plurality of different positions. Through means incorporated in the board, a circuit 3 can detect partly the position and partly the type of the identification elements. The circuit 3 may be connected to a data terminal 5, printer 6, personal computer 7 and/or a main frame computer 8 as depicted in FIG. 1. The planning board of the invention permits a very large number of different positions and different types of marking elements, so that large information amounts can be exchanged via the lines 4.

Figure 2:
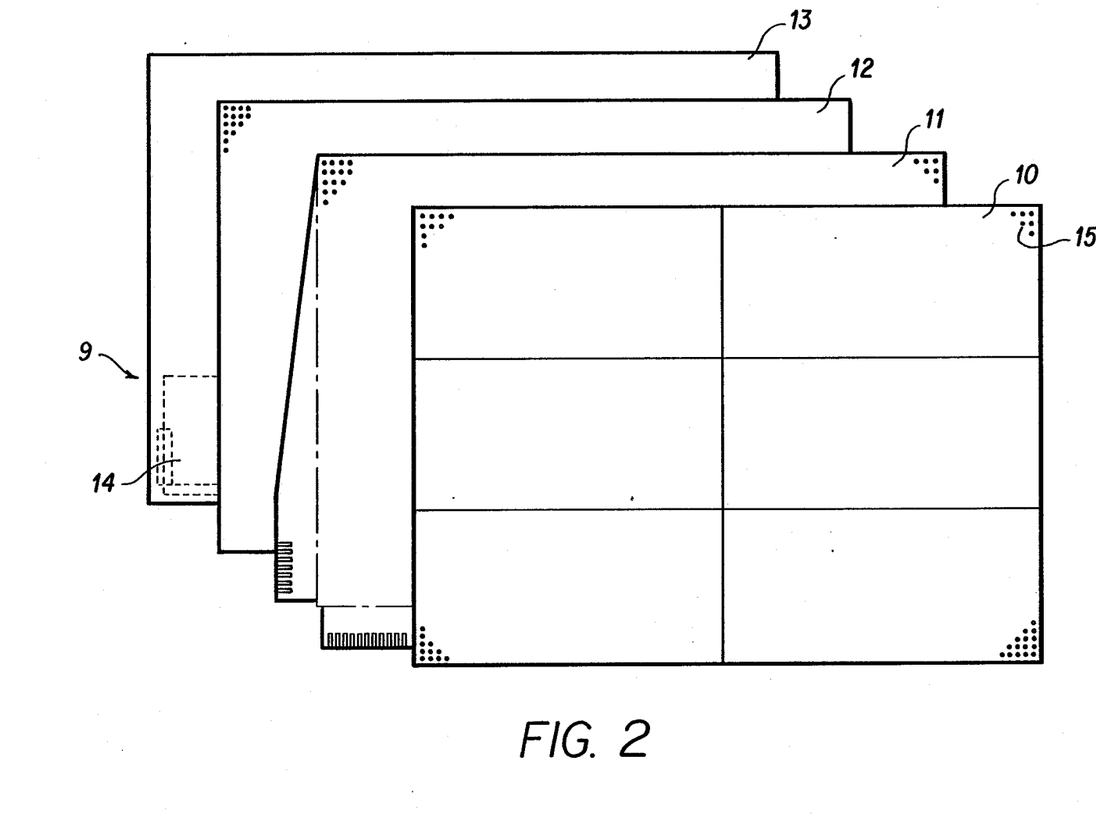

FIG. 2 shows an embodiment of a coupling plate 9 of the invention, the division of the board 1 shown in FIG. 1 indicating that the board may consist of eight coupling plates of the type shown in FIG. 2. Each coupling plate comprises a front plate 10 provided with a modular pattern of coupling studs 15, a so-called flexprint 11, a rear plate 12 and a plate 13 for suspension of the planning board and for reception of a control circuit in the cavity indicated at 14. The plates 10–12 are arranged and assembled as appears from FIGS. 3 and 4.

Figure 3:
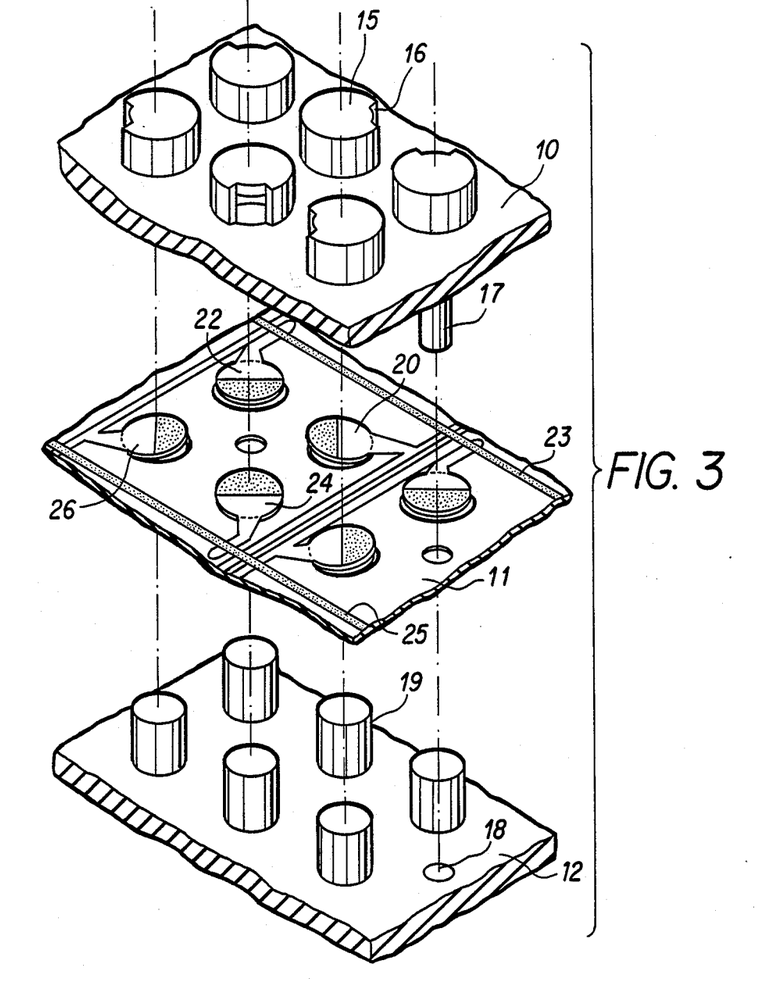
FIGS. 3 and 4 show details of a first embodiment of the invention.
Figure 5:
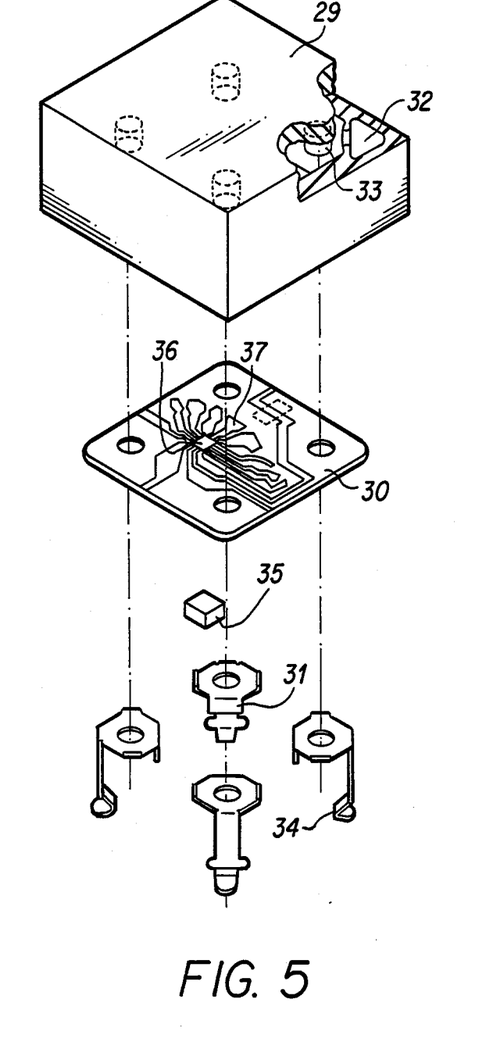
FIG. 5 shows an embodiment of a marking element for use in the invention.

As mentioned, the plate 10 has a plurality of coupling studs disposed with a mutual modular distance and adapted to be received in a cavity in the underside of a marking element (FIG. 5). The coupling studs 15 are hollow and are open downwardly and laterally via a cut 16 extending in the full height of the coupling stud and over a fraction of its arc length. The underside of the plate 10 is provided with a plurality of guide pins 17 adapted to be received in guide holes 18 in the plate 12. The guide pins 17 are slightly longer than locking pins 19 on the plate 12, so that the guide pins ensure that the locking pins 19 hit the cavities in the coupling studs 15 exactly when the plate parts 10 and 12 are assembled around the flexprint 11.

The flexprint 11 comprises a flexible layer of electrically insulating material on which a plurality of electric conductors is applied by a technique known per se. The electrically conducting areas comprise partially punched flaps 20 flush with an associated coupling stud 15, and it will thus be appreciated that e.g. the flap 20 is pressed up into the cavity of the coupling stud 15 by means of the locking pin 19, so that the flap 20 is curved to firm engagement with the cylindrical surface of the coupling stud 19, thus providing electric contact via the cut 16 with the conductor or conductors in the flexprint 11 which are electrically connected to the flap 20. The flaps may optionally be bent completely or partially into the cavities by means of a tool before the plate 12 is mounted. The other flaps are arranged similarly, and it can be seen in the embodiment shown that the cuts 16 are disposed in four mutually different angular sections, corresponding to four mutually insulated power paths in the flexprint, each of said power paths connecting all flaps which are positioned in uniform angular sectors in the coupling studs. For example, the flap 20 may be contiguous with an electric conductor 21, while the flap 22 is contiguous with an electric conductor 23, the latter conductors constituting X and Y data lines, respectively. The flap 24 may be connected to the electric conductor 27 for feeding power supply to the marking elements.

Figure 4:
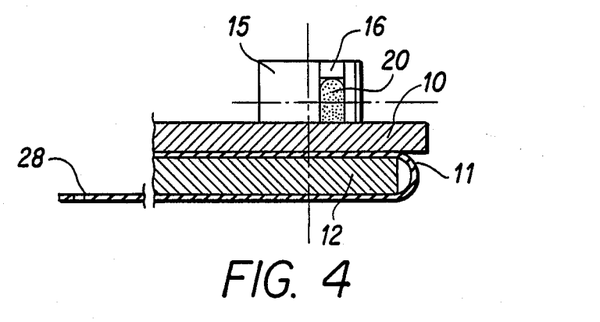

With reference to FIG. 4, which shows a section through the mutually mounted plates from FIG. 3, it will be seen how the flap 20 is accessible through the cut 16 for provision of electric contact with the X data conductor on the flexprint. Another expedient detail in the flexprint 11 appears from FIG. 4, as the flexprint 11 is bent along a section of the edge and has mutually isolated, electrically conducting areas which can readily be caused to cooperate with a terminal plug e.g. at 28 (compare also with the left corner at the bottom of the flexprint 11 from FIG. 2).

The flexprint 11 shown in FIG. 3 may be produced by etching a copper coating on an insulating film in accordance with the pattern shown in FIG. 3, the conductors 23 and 25 being provisionally ignored, so that the flaps 22 and 24 appear as local conducting areas. Then electrically insulating strips are placed transversely to the conductors 21 and 27, following which the conductors 23 and 25 may be placed on top of the insulating strips and be connected electrically to the associated flaps 22 and 24, respectively. It will be seen in FIG. 3 that the flaps comprise some dark areas which may symbolize e.g. a coating with gold. This can be obtained by covering the flexprint, apart from the said areas. Then the partial punching of the flap is effected, thereby providing holes in the flexprint to receive the guide pins 17.

FIG. 5 shows details of a preferred embodiment of a marking element for use in connection with the invention. For clarity, this marking element is not provided with visual texts or signs on the surface. The marking element comprises a housing 29 with a downwardly open cavity to receive a circuit 30 and to receive four adjacent studs 15 from FIG. 3, so that the housing 29 may be attached mechanically on the planning board of the invention. To provide electric contact between the circuit 30 and the flaps 20, 22, 24 and 26 shown in FIG. 3, the housing in FIG. 5 has four electrically conducting legs 31 which are mechanically guided in a cavity 32 and an attachment pin 33, and which are electrically connected to a conductor on the circuit 30. The contact face 34 of each leg can provide resilient contact with a flap from the flexprint via an associated cut 16. It will be appreciated that the shown arrangement entails that the mutual distance between two different positions of a marking element corresponds to twice the modular distance between the coupling studs 15.

Figure 6:
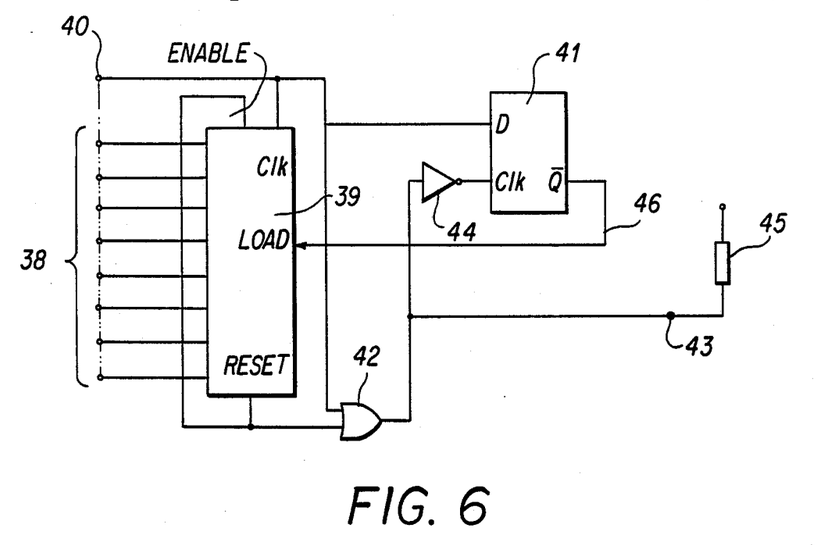
FIG. 6 shows an example of the arrangement of a simple electric circuit in a marking element.
Figure 7:
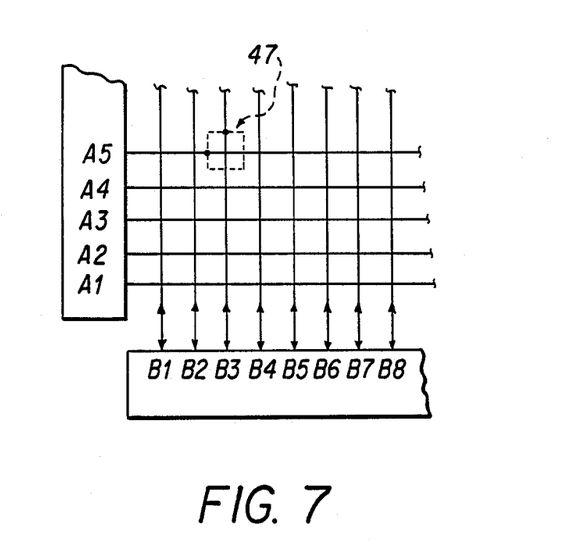
FIG. 7 is a very simplified view of an electric matrix which may be contained in the board by means of the invention.

The print board 30 may be adapted to receive an integrated circuit 35 at the location indicated at 36, so that power supply is fed via the contact legs to the circuit 35, which contains at least an identification circuit e.g. of the type shown in FIG. 6. The latter circuit contains an identification code which may be set beforehand, e.g. by breaking some of the program paths indicated at 37 in the circuit 30.

FIG. 6 shows a preferred, very simple and thus inexpensive identification circuit for the marking element. The circuit comprises some inputs 38 which are hard wired as explained in connection with the program paths 37 from FIG. 5, and which thus define an identification code for a combined counter and comparator circuit 39. The latter circuit receives input signals via a terminal 40, which is moreover connected to a D type multivibrator 41 and an OR gate 42, whose open collector output is connected partly to an output terminal 43 and partly to the multivibrator 41 via an inverter 44. In short, the circuit may serve as an identification circuit in that the input terminal 40 is kept at a high level (which entails that the open collector output of the OR gate 42 is three stated, i.e. kept at a high level by means of a resistor 45), and using the output terminal 43 as an input terminal for a brief switch from high to low signal level the multivibrator 41 can be triggered to produce a load signal on the $\overline{Q}$ output to the line 46. The load signal entails that the counter starts counting the number of signals on the input terminal 40, and as long as the count does not correspond to the identification code, the output signal on the terminal 43 will reproduce the input signal on the input terminal 40, but when the counter has counted to the identification code, the OR gate 42 causes the output terminal 43 to go to high level. When such a circuit is contained in the marking element 47 shown in FIG. 7, the position in the A-B matrix and the identification code of the element can be detected very easily by means of the schematically shown circuits comprising partly a plurality of output gates A1, A2 . . . and a plurality of two-way communication gates B1, B2 . . . It will thus be appreciated that the position A5, B3 of the marking element 47 can be detected when the A5 gate is connected to the input terminal 40, while the gate 83 is connected to the output terminal 43 on the circuit from FIG. 6. It is noted that the position can be detected already after the first few signal changes on input and output, whereas the identification code cannot be detected until the input terminal 40 has received a plurality of input pulses corresponding to the associated identification code.

Figure 8:
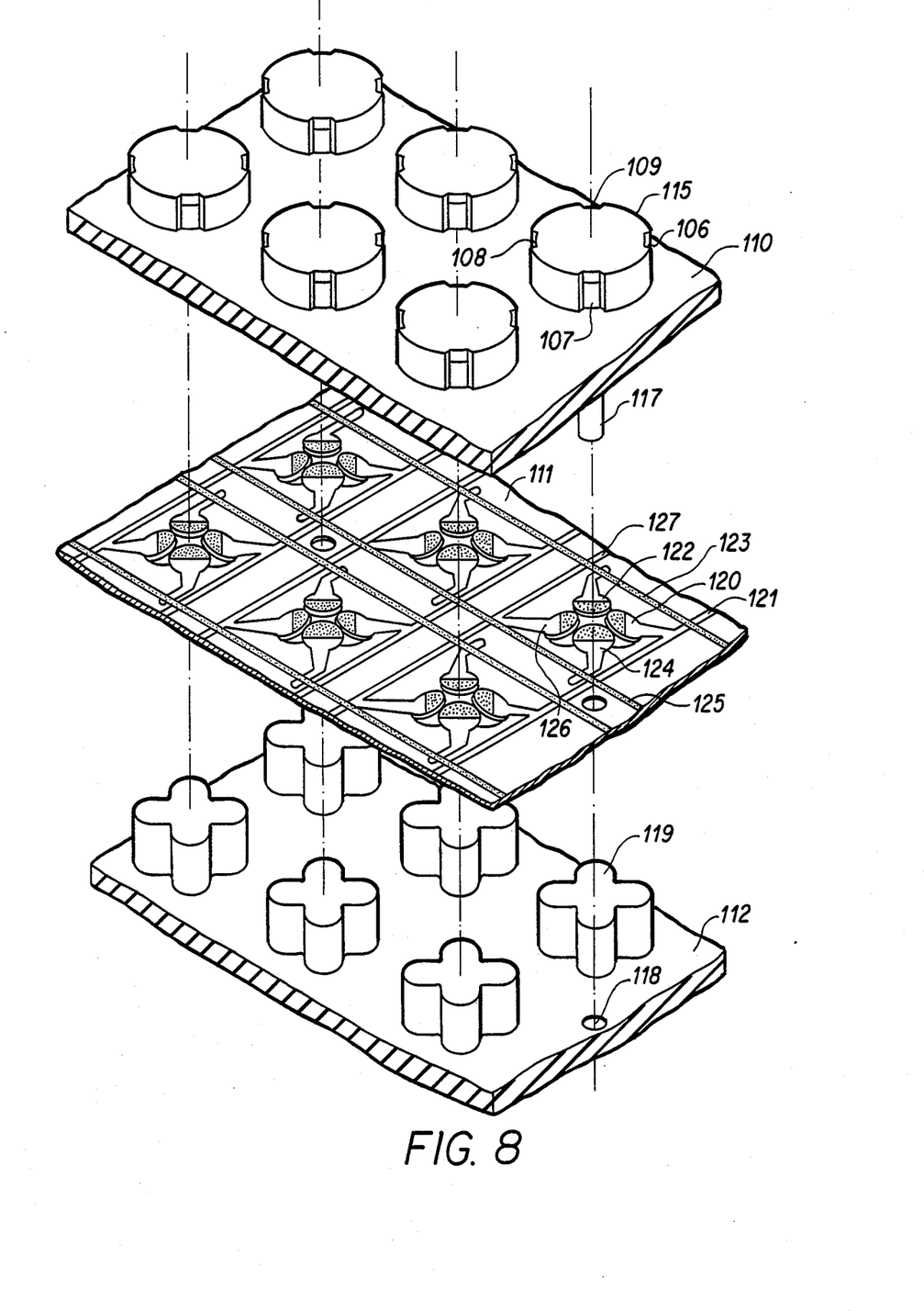

When the marking element shown in FIG. 5 is used on the plate which appears from FIG. 3, the minimum distance between two different positions on the plate corresponds to twice the modular distance between the coupling studs 15, because only one coupling flap 20 is provided per coupling stud 15. The embodiment shown in FIG. 8 has four electric coupling flaps per mechanical coupling stud so that the minimum distance between various positions on the board corresponds to the modular distance between the coupling studs. When the two last digits in the reference numbers in FIG. 8 correspond to what is shown in FIG. 3, this indicates that the parts have the same functions. Thus, the flexprint 111 corresponds to the flexprint 11, apart from the dimension and position of the holes for the guide pins 117. The locking pins 119 have a cross-section which corresponds to the contour of the cavity in the coupling stud 115, so that the flaps 120, 122, 124 and 126 are bent upwardly and fixed in the coupling stud 115. Whether the embodiment shown in FIG. 3 or in FIG. 8 is preferred is primarily a question of the dimensions of the mechanical coupling studs, it being observed that a marking element of the type shown in FIG. 5 may be used in connection with the embodiment shown in FIG. 8, the contact legs 34 cooperating with their respective ones of the contact areas 106, 107, 108 and 109.

Figure 9:
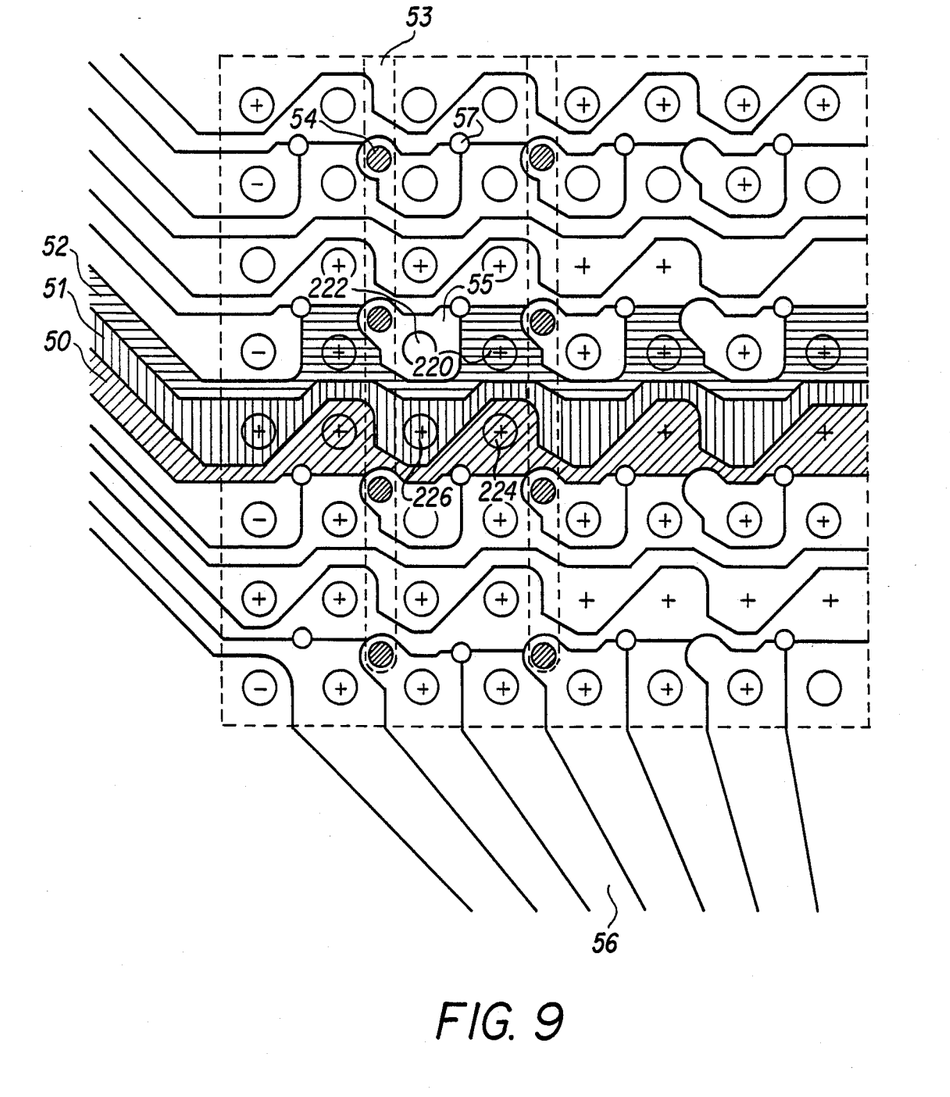
FIG. 9 shows a preferred layout of the electrically conducting areas in the board.

FIG. 9 shows a preferred embodiment of the layout of the electrically conducting areas in the flexprint. The starting material is preferably a thin electrically insulating film coated with a layer of copper. In accordance with prior art, the copper is etched away in the pattern indicated by the broad lines in FIG. 9. This leaves a plurality of sets of three mutually different copper belts, a single set being shown by the hatced areas in FIG. 9. Thus, this comprises a negative conductor 50, a positive conductor 51 and an output conductor 52. Then insulating strips are applied as shown by the dashed lines 53 said strips having holes 54 within the remaining copper fields, and an additional strip of electrically conducting material is applied on top of the insulating strips which makes contact with the lastmentioned electrically conducting fields, such as the area 55 and the terminal area 56, via the holes 54. Then the flaps described previously are punched, and the punched areas 220, 222, 224 and 226 shown in FIG. 9 are directly comparable to the areas 120, 122, 124 and 126 in FIG. 8 or the areas 20, 22, 24 and 26 in FIG. 3, so that the layout appearing from FIG. 9 can in principle be used in connection with both the embodiment of FIG. 3 and the embodiment of FIG. 8. It is noted that the punching also provides the shown holes 57 which serve to receive the guide pins 17 from FIG. 3. Preferably, the terminal area 56 is used as an input terminal, the input impedance for the identification circuits being very high, thus permitting a greater internal resistance of the conducting strip connecting the areas 222. Conversely, it is expedient to obtain copper areas as large as possible for power supply and for carrying the output signals from the identifications circuits.

I claim:

1. A coupling plate consisting of a number of layers and having a plurality of electric coupling points adapted to cooperate with electric coupling means on some elements when these are placed on the coupling plate, characterized in that the plate comprises two parallel plates, between which there is provided at least one electrically insulating carrier layer for a pattern of a plurality of mutually isolated electrically conducting areas, some of which being partially punched, and that an electric coupling point comprises at least one depression in one of the plates for receiving a partially punched flap of an electrically conducting area in a position transverse to the plane of the coupling plate.

2. A coupling plate according to claim 1, characterized in that the second plate has projections which are flush with the depressions and face these to fix said flaps in the respective depressions in the first plate.

3. A coupling plate according to claim 1 or 2, characterized in that the first plate comprises a plurality of rows of coupling studs projecting from its upper side, said coupling studs having a mutual modular distance to mechanically retain the said elements on the plate, said coupling studs being hollow and downwardly open to provide said depressions and open laterally via at least one cut in the side wall of the coupling stud.

4. A coupling plate according to claim 1 or 2, characterized in that one of the plates has a plurality of guide pins facing the second plate to be received in aligned holes in the relatively thin layer of material and in the second one of the plates.

5. A coupling plate according to claim 1 or 2, characterized in that a section of the carrier layer, which has electrically conductive terminal areas connected with the flaps, are bent along one of the edges of the coupling plate to provide a multiplug.

6. A method of producing a coupling plate having a plurality of electric coupling points adapted to cooperate with electric coupling means on some elements when these are placed on the coupling plate, characterized by providing a plurality of mutually isolated, electrically conducting areas on a layer of electrically insulating material, producing a plurality of flaps, e.g. by punching, which are contiguous with said layer via slightly flexible, electrically conducting connecting members, and bending the flaps into respective cavities in a preferably self-supporting plate and fixing these in said cavities.

7. A method according to claim 6, characterized by introducing the flaps into the cavities by means of a tool.

8. A method according to claim 6 or 7, characterized by introducing and fixing the flaps in the cavities by assembling the self-supporting plate and a second plate having a plurality of projections facing the cavities of the first plate, said projections having a cross-section corresponding to the contour of a respective one of the cavities.

9. A method according to claim 6, characterized by producing said layer as several layers of alternately insulating material and electrically conducting material.

10. A method according to claims 6, 7 or 9, characterized by applying a layer of electrically conducting material to the areas of the electrically conducting material intended for contact formation.

11. The invention in accordance with claim 1 wherein a plurality of said coupling plates are joined together to form a planning board.

12. A board according to claim 11, characterized in that the coupling plates are secured to a plane base and adjoin each other edge to edge in accordance with a modular measure defined by the marking elements.

* * * * *